United States Patent
Bak et al.

(10) Patent No.: US 10,334,219 B2
(45) Date of Patent: Jun. 25, 2019

(54) APPARATUS FOR SWITCHING/ROUTING IMAGE SIGNALS THROUGH BANDWIDTH SPLITTING AND REDUCTION AND THE METHOD THEREOF

(71) Applicant: LUMANTEK Co., Ltd, Seoul (KR)

(72) Inventors: Chun Dae Bak, Incheon (KR); Chang Su Kim, Seoul (KR)

(73) Assignee: LUMANTEK Co., Ltd (KR)

(*) Notice: Subject to any disclaimer, the term of this patent is extended or adjusted under 35 U.S.C. 154(b) by 148 days.

(21) Appl. No.: 15/292,076

(22) Filed: Oct. 12, 2016

(65) Prior Publication Data

US 2017/0104974 A1    Apr. 13, 2017

(30) Foreign Application Priority Data

Oct. 12, 2015  (KR) .................. 10-2015-0142304
Nov. 9, 2015   (KR) .................. 10-2015-0156993

(51) Int. Cl.
| | |
|---|---|
| *H04N 7/18* | (2006.01) |
| *H04N 11/24* | (2006.01) |
| *H04N 21/236* | (2011.01) |
| *H04N 21/61* | (2011.01) |
| *H04N 21/8547* | (2011.01) |
| *H04N 19/61* | (2014.01) |

(52) U.S. Cl.
CPC ............ *H04N 11/28* (2019.01); *H04N 19/61* (2014.11); *H04N 21/236* (2013.01); *H04N 21/6125* (2013.01); *H04N 21/8547* (2013.01)

(58) Field of Classification Search
CPC .................................. H04N 7/30; H04N 7/26

USPC ........................................ 375/240.1–240.28
See application file for complete search history.

(56) References Cited

U.S. PATENT DOCUMENTS

| | | | |
|---|---|---|---|
| 7,756,118 B2 | 7/2010 | Harmon et al. | |
| 2009/0238263 A1* | 9/2009 | Jaggi | H04N 21/2187 |
| | | | 375/240.2 |

FOREIGN PATENT DOCUMENTS

| | | |
|---|---|---|
| KR | 20010102178 A | 11/2001 |
| KR | 20090003980 A | 1/2009 |
| KR | 20110133854 A | 12/2011 |
| KR | 101357182 B1 | 1/2014 |

* cited by examiner

*Primary Examiner* — Anand S Rao
(74) *Attorney, Agent, or Firm* — Renaissance IP Law Group LLP

(57) ABSTRACT

The present invention relates to an apparatus and method for IP switching/routing SDI format image signal through bandwidth splitting and reduction, more specifically, which decomposes image signals consisting of YCbCr type color format entered with serial digital interface (SDI) into Y (luminance) component and C (chrominance) component, or multiple bit slice components; converts the components into IP packets and performs switching and/or routing of the IP packets; extracts Y component and C component or multiple bit slice components from the switched or routed IP packets; and combines the components into SDI format image signal and outputs the combined SDI format image signal. In addition, the present invention provides an apparatus switching/routing image signals through grid based networking, in which broadband switching or routing is performed with multiple narrow band switches or routers by switching or routing image signals through bandwidth splitting and reduction.

20 Claims, 10 Drawing Sheets

Whatever a single bitplane has an error, the entire image is corrupted.

Y should be duplicated, C may not be duplicated, BW of Y need to be guaranteed.

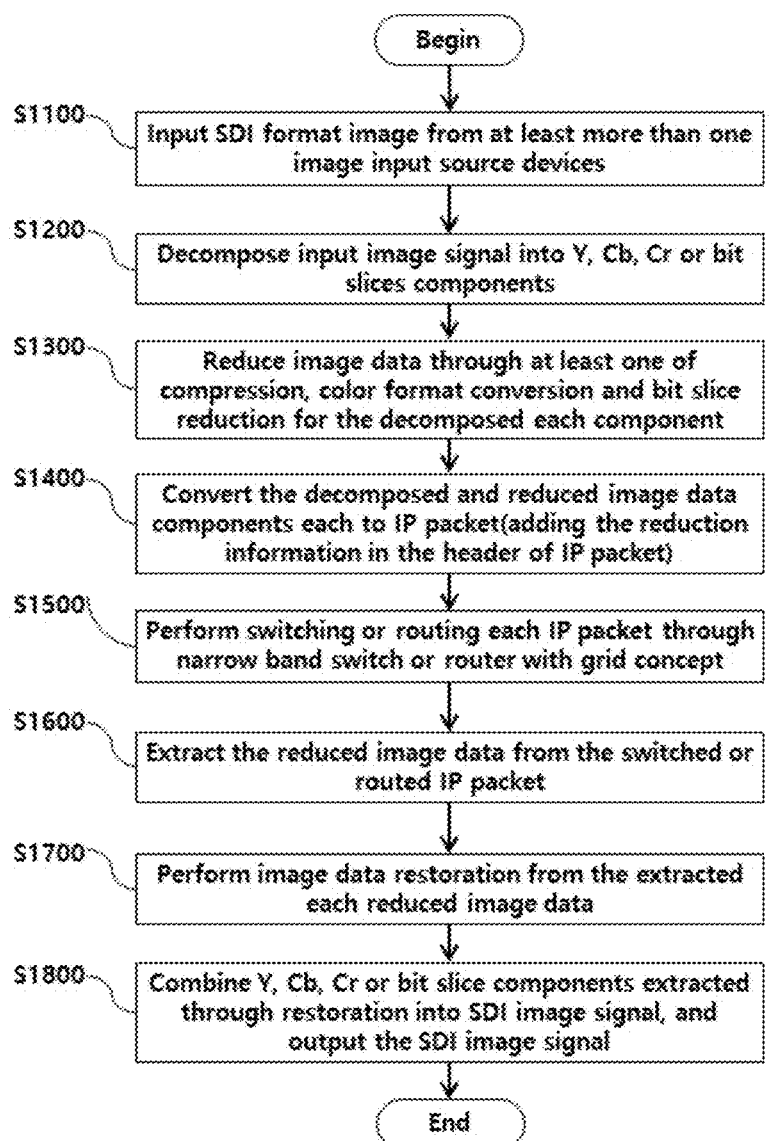

APPARATUS FOR SWITCHING/ROUTING IMAGE SIGNALS THROUGH BANDWIDTH SPLITTING AND REDUCTION AND THE METHOD THEREOF

FIELD OF THE INVENTION

The present invention relates to an apparatus and method for IP switching/routing image signals through bandwidth splitting and reduction, more specifically, which decomposes image signal consisting of YCbCr type color format entered with serial digital interface (SDI) into Y (luminance) component and C (chrominance) component, or multiple bit slice components; converts the components into IP packets and performs switching and/or routing of packets; extracts Y component and C component or multiple bit slice components from switched or routed IP packets; and combines the components into SDI format image signal and outputs the combined image signal. The present invention provides an apparatus switching/routing image signals through grid based networking, in which broadband switching or routing is performed with multiple narrow band switches or routers by switching or routing image signals through bandwidth splitting and reduction.

BACKGROUND OF THE INVENTION

Recently due to development of broadband internet, image processing and display technologies, watching broadcast programs or movies conveniently at home is a popular scene of ordinary households. As the dissemination of digital TV is prevalent, large-screen TVs are generally preferred in the market. But in case displaying a specific part of a scene like human face having HD (High Definition) resolution in large-screen displays, squared pixels are revealed so that image quality is degraded. Therefore, UHD (Ultra High Definition) video service having 4 times to 16 times resolution compared with the conventional HD video attracts public attention as a next generation broadcasting technology. The UHD video can provide audience with sense of reality so that it is expected to use in various areas including broadcasting, teleconference, education, medicine, and game. But one of the problems in providing UHD video service is the increase of data volume. Table 1 shows SMPTE standard regarding the transmission of SD-SDI, HD-SDI, and UHD-SDI video formats. For example, 4K UHD video (3840*2160, 60 frames), defined as SMPTE ST-2082, requires bandwidth of 12 Gbits/s.

TABLE 1

| Standard | Name | Bitrates | Video formats |
| --- | --- | --- | --- |
| SMPTE 259M | SD-SDI | 270 Mbit/s, 360 Mbit/s, 143 Mbit/s and 177 Mbit/s | 480i, 576i |
| SMPTE 344M | ED-SDI | 540 Mbit/s | 480p, 576p |
| SMPTE 292M | HD-SDI | 1.485 Gbit/s, and 1.485/1.001 Gbit/s | 720p, 1080i |
| SMPTE 372M | Dual Link HD-SDI | 2.970 Gbit/s, and 2.970/1.001 Gbit/s | 1080p |
| SMPTE 424M | 3G-SDI | 2.970 Gbit/s, and 2.970/1.001 Gbit/s | 1080p |
| SMPTE ST-2081 | 6G UHD-SDI | 6 Gbit/s | 4Kp30 |
| SMPTE ST-2082 | 12G UHD-SDI | 12 Gbit/s | 4Kp60 |

Hence, to perform switching or routing the videos having 12 G UHD-SDI format, it is required to use switches or routers more than 40 G bandwidth since switches or routers having 10 G bandwidth cannot process a single channel. In this case, it is difficult to provide video service since network infrastructure supporting 40 G bandwidth including switches and routers is not sufficient and service provision cost is increased because single wideband traffic is processed.

Although there is a bandwidth problem in handling 12 G UHD-SDI with 10 G routers because of the required bandwidth for 12 G UHD-SDI, any device or method does not exist to handle 12 G UHD-SDI signal with multiple switches or routers having low bandwidth like 1 G or 2.5 G. In other words, any switch or router is not yet developed in which a broadband SDI signal having 12 G is divided into multiple relatively low bandwidth signals such as 1 G or 2.5 G and processed.

In addition, in case that the videos having large data size are compressed, converted into IP packets and then switching and routing are performed, using JPEG2000 algorithm is previously proposed but it has processing speed and delay problems in real-time switching/routing because it requires large amount of computations so that the processing is delayed.

Considering the current situation, the present invention proposes an apparatus for efficiently switching or routing UHD videos having large bandwidths and the method thereof, which decomposes image signal consisting of YCbCr type (e.g. 4:2:2 type) color format entered with SDI into Y component and C component, compresses the decomposed video signal components with one-dimensional compression (discrete cosine transform (DCT), discrete wavelet transform (DWT), quantization, scan, run-length coding (RLC), variable length coding (VLC), etc.), conversion of color format, or bit slice truncation (for example, removing part of a bit slice in the least significant bits of C components) for reducing the bandwidth, converts the components into IP packets and performs switching or routing of packets; then extracts Y component and C component or multiple bit slice components from switched or routed IP packets and restores the compressed data components into Y component and C component (with the methods, 1-D IDCT, 1-D DWT, inverse quantization, inverse scan, run-length decoding (RLD), variable length decoding (VLD), etc.); and combines the components into SDI format image signal and outputs the combined image signal.

One of the previous documents related with the technological issues in the present invention is Korea patent registration No. 1415281 (2014 Jun. 27), which relates to a virtual dynamic dual streaming (VDDS) system for video transmission of a HD-CCTV camera; it stores full HD video signals recorded through multiple HD-CCTV cameras at the storage media such as local hard disks of DVR (stream1), or converts the components into a full HD video signal while passing through a multiplexer (MUX) and transmits as a network stream through a video transmission module (stream2); and features a server that receives a full HD video signals transferred with the network streams through switches and then displays a full HD video composed by multiple channels from 1 to 16 channels on a monitor.

Another example of the previous documents related with the technological issues in the present invention is Korea patent publication No. 2011-0133854 (2011 Dec. 14) which relates to an apparatus transferring compressed videos using SDI and the method thereof; it features creating a separate compressed video data from a recorded video data, displaying a real-time video based on at least one camera and the video data received from the camera by sending the compressed video data inserted into auxiliary data packets of the video data, and extracting the compressed video data from the video data, and has the effect on lowering the system complexity of a digital video equipment by dividing the video compressing load to at least one of cameras.

In addition, Korea patent registration No. 1357182 (2014 Jan. 23) relates to a high-speed signal processing HD SDI video transmission apparatus, more specifically, which processes separately video, audio, data and Ethernet signals, controls transmission of each separated signal to the equipment or a device capable of the corresponding signal, and is adequate to preventing optical loss.

In addition, U.S. Pat. No. 7,756,118 (2010 Jul. 13) relates to a video switching system utilizing preferentially shared networks, which eventually controls multiple video/audio routing switches and IP routers connected to a router control system by remotely controlling the router control system through multiple user control panels, and is configured to modify priorities in processing network traffic in such a way that it assigns high priorities to important digital video data streams so as to transmit high priority video data streams first on backbone networks compared with other low priority data.

Though the above technical documentations deal with video transmission, switching, or routing method or equipment of SDI video format, they are limited to the videos having resolutions less than HD; and do not resolve the aforementioned problems or suggest a clue for solving the problems since they do not propose any method or equipment for switching or routing 12 G UHD-SDI videos requiring more bandwidths.

As described above, the present invention, therefore, proposes to an apparatus IP switching/routing image signals through bandwidth splitting and reduction and the method thereof, more specifically, which decomposes image signal consisting of YCbCr type color format entered with SDI into Y component and C component, or multiple bit slice components; converts the components into IP packets and performs switching or routing of packets; extracts Y component and C component from the switched or routed IP packets and combines the components into SDI format video signal and outputs the combined video signal.

SUMMARY OF THE INVENTION

To solve the above conventional problems, the objective of the present invention is to provide an apparatus for effectively switching/routing ultra-high definition video signals and the method thereof, which decomposes image signal consisting of YCbCr type color format entered with SDI into Y component and C component or multiple bit slice components; converts the components into IP packets and performs switching or routing of packets with multiple narrow-band switches or routers; extracts Y component and C component or multiple bit slice components from the switched or routed IP packets and combines the components into SDI format video signal and outputs the combined video signal.

In addition, the present invention relates to an apparatus for switching/routing of video signals and the method thereof utilizing grid-based networking concept in which multiple narrow-band switches or routers are used to perform wideband switching or routing by reducing the bandwidth of a ultra-high definition video having large bandwidth utilizing compression of SDI format video signals, conversion of color format, reduction of bit slice so as to process it with IP switching/routing appliances having small bandwidth. In other words, the objective of the present invention is to provide a method for enhancing bandwidth utilization rate of IP switches or routers on a network and the apparatus thereof.

In addition, the objective of the present invention is to provide an apparatus for switching/routing and the method thereof, which applies various one-dimensional compression techniques to SDI format video signals so as to perform lossless compression, or high-speed processing while reducing processing delay compared with two-dimensional compression techniques.

In addition, the present invention provides a method for enhancing bandwidth utilization rate of IP switches or routers on a network and the apparatus thereof in which the Y component is further decomposed into bit slices in addition to the said C component so as to process a broadband video signal with IP switching or routing appliances having less bandwidth.

To achieve the objectives, an IP switching/routing apparatus through bandwidth splitting of SDI format video signals in accordance with an embodiment of the present invention comprises a bandwidth compression module which decomposes the SDI format video signal into multiple components and converts the components into IP packets, a switching/routing module which performs switching or routing of the converted IP packets.

The switching/routing apparatus further comprises a bandwidth restoration module which extracts the compressed data from the switched or routed IP packets, extracts multiple video signal components by restoring the compressed data, and then composes the SDI format video signal from the multiple video signal components.

The routing apparatus further comprises a control module for generating synchronization signal and control signal used for bandwidth reduction and packet processing, and bandwidth restoration among the bandwidth compression module, the switching/routing module, and the bandwidth restoration module.

The decomposition is to separate the SDI format video signal into Y component and C component or multiple bit slice components and the composition and the composition features combining the SDI format video signal with the Y component and C component or multiple bit slice components.

The switching/routing apparatus is configured to compress the data by performing one-dimensional data compression, conversion of color format, reduction of part of a bit slice, or the combination thereof; and the restoration of the data by performing restoration with the one-dimensional data compression, restoration of color format, restoration of part of a bit slice, and the combination thereof.

The compression is to compress the data with 1-D DCT, 1-D DWT, quantization, scan, RLC, VLC or a combination of these and the restoration of the compressed data is to perform inverse process with at least one of 1-D IDCT, 1-D IDWT, inverse quantization, inverse scan, RLD, VLD, and a combination of these.

The compression of the data includes 2-dimensional compression and the 2-dimensional compression features the block size of the larger horizontal length than the vertical length (e.g. 8×4, 16×4, 16×2, 16×8, etc.).

The IP switching/routing module comprises at least one IP switch or router processing separately multiple IP packets on the network.

Moreover, the IP switching/routing method through bandwidth reduction of SDI format video signals in accordance with an embodiment of the present invention comprises a bandwidth compression phase in which the SDI format video signal is decomposed into multiple components, compressed and converted into IP packets, a switching/routing phase in which the converted packets are switched or routed.

The IP switching/routing method further comprises a bandwidth restoration phase in which the compressed data is extracted from the switched or routed packets, multiple video signal components are extracted by restoring the compressed data, and the SDI format video signal is composed from the multiple video signal components.

The IP switching/routing method further comprises a control phase for generating synchronization signal and control signal used for bandwidth reduction and packet processing, and bandwidth restoration among the bandwidth compression phase, the switching/routing phase, and the bandwidth restoration phase.

The C component is further decomposed into Cr component and Cb component and the Cr component and the Cb component are combined into the C component.

The decomposition is to separate the SDI format video signal into Y component and C component or multiple bit slice components and the composition and the composition features combining the SDI format video signal with the Y component and C component or multiple bit slice components.

The C component is further decomposed into Cr component and Cb component and the Cr component and the Cb component are combined into the C component.

The IP switching/routing module features consisting of at least more than an IP switch or router processing separately multiple IP packets on the network.

The present invention relates to an apparatus for IP switching/routing image signals through decomposed processing of SDI format video signals and the method thereof, which processes a UHD video having a large bandwidth with general-purpose IP switches or routers having less bandwidth by decomposing a video signal consisting of YCbCr type color format entered with SDI into Y component and C component, converting the components into IP packets and performing switching or routing of packets, extracting Y component and C component from switched or routed IP packets, and combining the components into SDI format video signal and outputting the combined video signal so as to significantly lower the capital expenditure on constructing the infrastructure for processing ultra-high definition (UHD) video and the provision system.

The present invention maximizes the usage rate of the previously constructed network infrastructure since the broadband ultra-high definition (UHD) video service can be provided with the network infrastructure having a processing capacity of lower bandwidths.

Hence, since broadband switching or routing can be performed with multiple narrow-band IP switches or routers through grid based networking concept in the present invention, the present invention enhances the utilization rate of network resources by utilizing the existing infrastructure so as to reduce the expenditure on network infrastructure.

The present invention can early provision ultra-high definition (UHD) video service before the network infrastructure is not prepared.

BRIEF DESCRIPTION OF THE DRAWINGS

FIG. 12 is a flow diagram for displaying the operational process of the grid based IP switching/routing apparatus through bandwidth reduction of SDI format video signals in accordance with an embodiment of the present invention.

DETAILED DESCRIPTION OF THE PREFERRED EMBODIMENTS

Hereinafter, a preferred embodiment of the present invention is explained in detail with reference to accompanying figures. The same reference sign in each figure represents the same component. In addition, the specific structural or functional explanation for embodiments of the present invention is used for exemplifying the embodiments only and all the terms including technical and scientific terms used in this document have the same meaning, unless defined differently, as the meaning generally understood by those who have ordinary knowledge in the technical area the present invention belongs to.

The terms defined in commonly used dictionaries are interpreted as the same meaning coincident with the contextual meaning in the related technology and if not explicitly defined in this specification, it is preferable not to be interpreted as too ideal or perfunctory meaning.

For reference, the apparatus or the method the present invention proposes is more effective to ultra-high definition (UHD) videos but not limited to the SDI format video signals having UHD resolution described in the explanation for the present invention since the present invention is also effective to high-definition (HD) or standard definition (SD) video signals.

Figure 1:
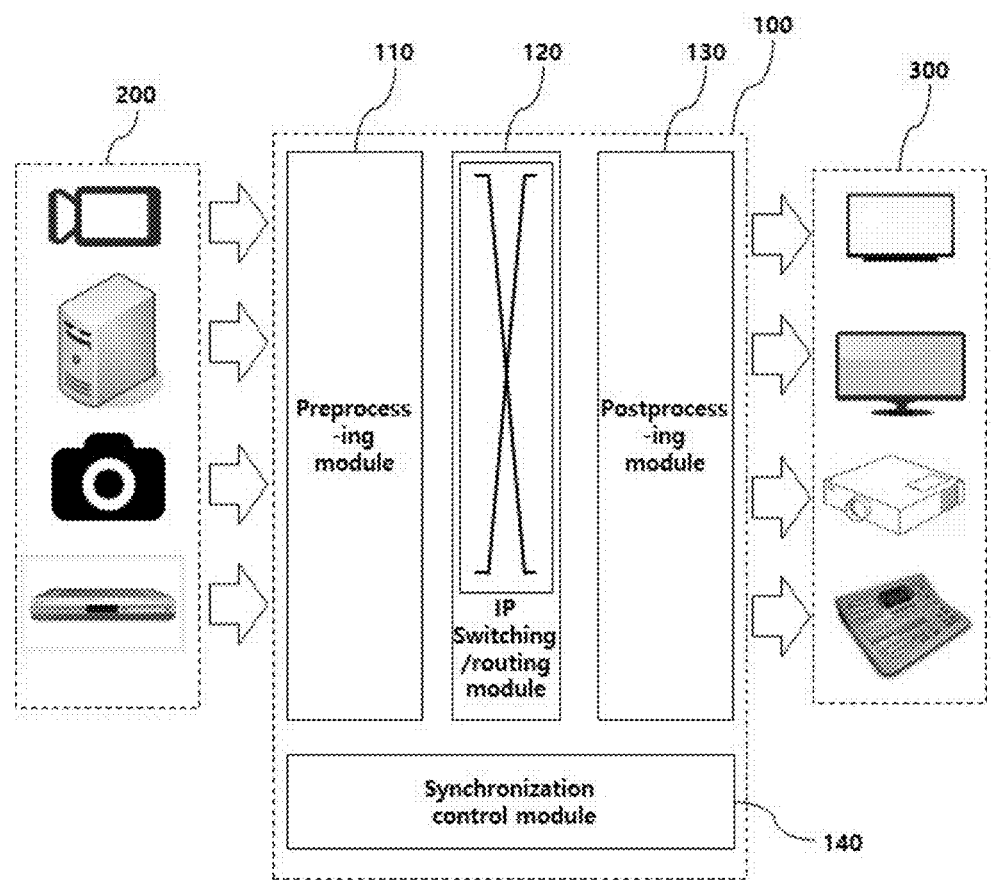
FIG. 1 is a conceptual diagram for explaining the operations of the IP switching/routing apparatus through separate processing of SDI format video signals in accordance with an embodiment of the present invention.

FIG. 1 is a conceptual diagram for explaining the operations of the IP switching/routing apparatus through separate processing of SDI format video signals in accordance with an embodiment of the present invention.

As shown in FIG. 1, the operations of the IP switching/routing apparatus through separate processing of SDI format video signals are made such that if a (ultra-) high definition digital video recorded by a video source device (200) such as a video camera, a broadcasting transmitter, a broadcasting server, a digital multimedia editor, a video recorder, or etc. is entered through SDI to the IP switching/routing apparatus through separate processing of SDI format video signals (100), a preprocessing module (110) separates the video signal consisting of YCbCr type color format (e.g. 4:2:0, 4:2:2, 4:4:4, or etc.) into Y component and C component; and the decomposed Y component and C component are converted into IP packets, respectively. By this process, the traffic of large volume videos having large bandwidths is broken up into small traffic of multiple videos requiring half or less bandwidths.

For example, to perform switching or routing the videos having 12 G UHD-SDI format, it is required to process data at least 12 Gbits per second; if 12 G UHD-SDI video signal is, however, decomposed into Y component and C component, it can be composed of Y component and C component of 6 Gbits/s, respectively, since the data composition, Y:Cb:Cr, of the 12 G UHD-SDI video signal color format consists of 4:2:2. Moreover, if the C component is further decomposed into Cb and Cr components, then it can be decomposed into Cb component and Cr component of 3 Gbits/s, respectively. If the decomposed data as such is converted to IP packets and then the packets are switched or routed, the processing capacities of switches or routers can be reduced proportionally. In other words, multiple switches or routers having low processing capacities can be used to perform switching or routing of data requiring higher processing capacity.

Figure 2:
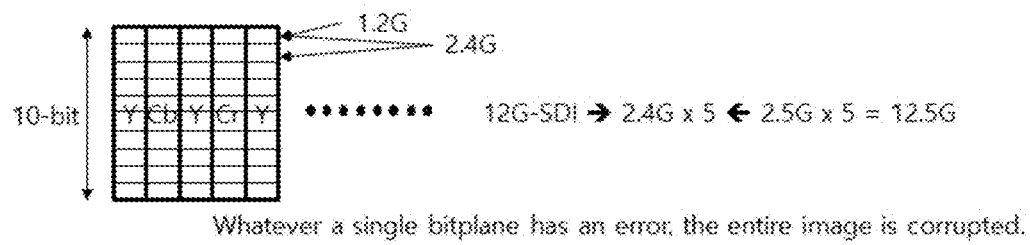
FIG. 2 is an explanatory diagram for describing the concept of decomposing large volume video signal into multiple small volume video signals in the IP switching/routing apparatus through separate processing of SDI format video signals in accordance with an embodiment of the present invention.
Figure 2:
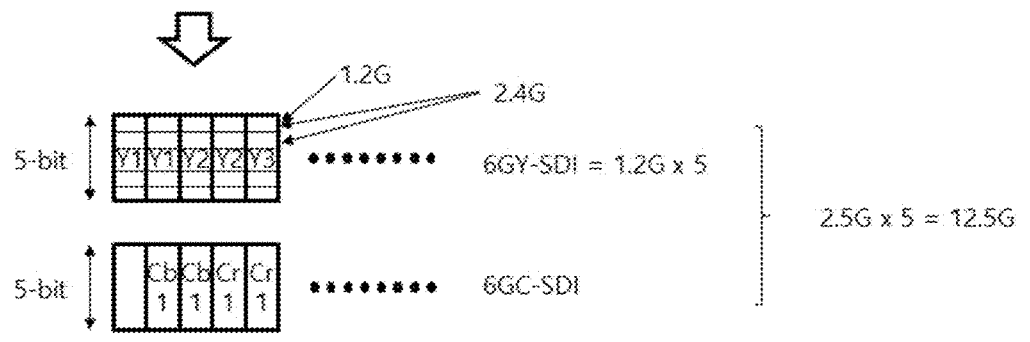

FIG. 2 is an explanatory diagram for describing the concept of decomposing large volume video signal into multiple small volume video signals in the IP switching/routing apparatus through separate processing of SDI format video signals in accordance with an embodiment of the present invention.

As examined above, in case of 12 G UHD-SDI video signal, the SDI video is decomposed into 6 G Y component, 3 G Cb component, and 3 G Cr component, respectively, by the preprocessing module (110); they are converted into IP packets, respectively, switched and routed via a network by IP switching/routing module (120) having 10 G bandwidth, and transmitted to subscribers through fiber optic cable or coaxial cable; however the Ethernet appliance (10 G, 40 G, 100 G switch, router, access network transmission equipment, etc.) for the switching and routing is still expensive and the Ethernet appliance having low bandwidth is impossible or difficult to handle high bandwidth traffic so that techniques are required to solve this problem.

To solve the problem, the preprocessing module (110) as shown in FIG. 2 divides the 6 G Y component of 12 G UHD-SDI, 10 bit Y-pixels into 5 bit-slices of 2 bits and 1.2 G traffic is allocated to each bit slice and processed. In addition, it is preferable to generate and process twelve 0.5 G traffic from 6 G Y component to use the existing network infrastructure since it is unnatural to divide it into 6 bit-slices of 1 G. It is well-known to the ordinary technicians to deal with the five 1.2 G traffic to be converted into IP packets and provide service with a 10 G network rather than to be transmitted by one 6 G component with a 10 G network with regard to traffic management (quality of service (QoS), service level agreement (SLA), or dynamic bandwidth allocation (DBA)).

For example, 1.2 G traffic is not directly processed with 1 G Ethernet appliance (or device). Since the traffic is 2.4 G (4/10×6 G=2.4 G) if 10-bit Y-pixels of 6 G is divided into 4-bit×2+1-bit×2, two 4-bit slices are processed with 2.5 G Ethernet appliance, and the remaining 0.6 G (1/10×6 G=0.6 G) slice can be 1 G Ethernet appliance. Thus it is required two 2.5 G and two 1 G (or three 2.5 G) for processing 6 G-Y component.

In addition, if the Cb and Cr components are converted into 4:2:0 format, 3 G C component can be divided into 1.5 G-Cb and 1.5 G-Cr, or 2.5 G and 1 G. Therefore, it is possible to process large bandwidth switching such as 12 G UHD-SDI by decomposing the signal into bit slices and processing each bit plane separately through multiple Ethernet appliances having multiple 1 G line cards.

As shown in FIG. 2, in case of processing separate bit-slices, it is important to deal with Y component securely because all video signals are corrupted if any bit plane of Y component is impaired during the transmission through the network. Thus, the Y component is processed with redundancy, or the bandwidth or the QoS for the component should be guaranteed. Though the C component is also important data, it is natural to consider the importance of Y component compared with C component.

Next, we explain further with regard to FIG. 1.

The data decomposed by the preprocessing module (110) and converted into IP packets are switched or routed by the IP switching/routing module (120). For example, 12 G UHD-SDI can be decomposed into 6 G-Y component, 3 G-Cb component, and 3 G-Cr component respectively so that it is possible to efficiently process videos having large bandwidths more than 10 G with 10 G IP switches or routers. If the decomposition and the conversion by the preprocessing module (110) are not performed, it is required to use exclusive switch/router for SDI more than 40 G for switching or routing 12 G UHD-SDI video data and therefore it largely increases construction expenditure of network infrastructure.

The IP switching/routing module is equipped with switching fabric and performs switching function by mapping source and destination addresses based on the switching or routing table controlling the switching or routing. The functions provided by conventional switches or routers can be used for hardware and software functions of switching or routing.

In addition, the switched or routed IP packets by the IP switching/routing module (120) are converted by the post-processing module (130) into Y, Cb, Cr video signal components, composed into SDI video format, and transmitted to the video displaying device (300) such as monitor, TV, projector, video editing appliance, display or broadcasting receiver.

In addition, the synchronization among video signals is necessarily required in decomposing the SDI video signal into Y, Cb, Cr video signal components or composing vice versa with the preprocessing module (110) and the postprocessing module (130).

In other words, the synchronization control module (140) provides synchronization signal required for decomposition of Y and C components and conversion of IP packets by the preprocessing module (110), switching or routing process by the IP switching/routing module (120), or extraction of Y and C components from IP packets and composition of SDI signal with the Y and C components by the postprocessing module (130) so that the video can be seamlessly decomposed and converted, switched, or routed throughout the whole system.

Figure 3:
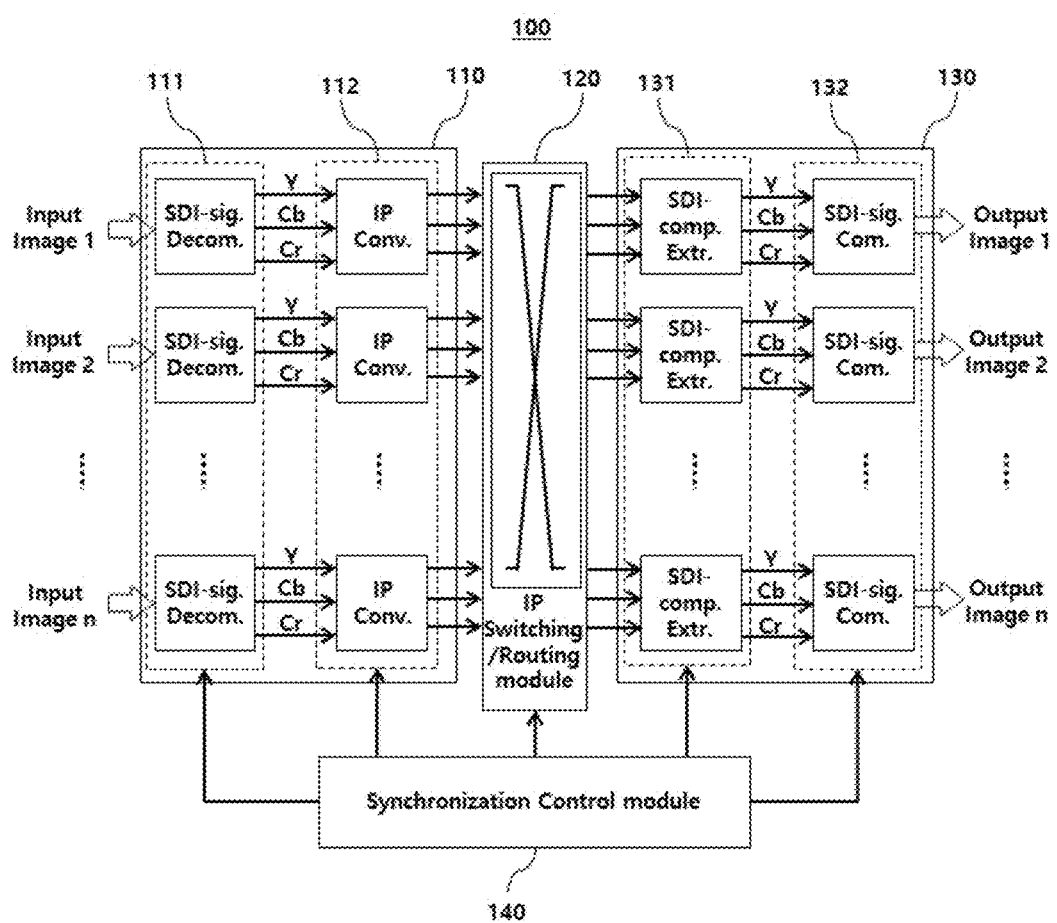
FIG. 3 is a block diagram for displaying the detailed configuration of the IP switching/routing apparatus through separate processing of SDI format video signals in accordance with an embodiment of the present invention.

FIG. 3 is a block diagram for displaying the detailed configuration of the IP switching/routing apparatus through separate processing of SDI format video signals in accordance with an embodiment of the present invention.

As shown in FIG. 3, the IP switching/routing apparatus through separate processing of SDI format video signals comprises a preprocessing module (110), an IP switching/routing module (120), a postprocessing module (130), and a synchronization control module (140); the preprocessing module (110) comprises a SDI signal decomposition part (111) and an IP conversion part (112); and the postprocessing module (130) comprises a SDI signal extraction part (131) and a SDI signal composition part (132).

The SDI signal decomposition part (111) of the preprocessing module (110) receives ultra-high definition digital videos from at least one of video source devices (n) (200) through SDI. The received SDI signal can be composed of 4:2:0, 4:2:2, or 4:4:4 color format. The SDI signal decomposition part (111) decomposes the SDI video signal into Y component and C component. If the SDI input signal is 12 G UHD-SDI case, it is decomposed into 6 G-Y, 3 G-Cb, and 3 G-Cr components, respectively. In this process the decomposition of Y, Cb, and Cr components is performed in synchronization with the synchronization control signal provided by the synchronization control module (140).

In addition, the SDI signal decomposition part (111) of the preprocessing module (110) includes further a function of decomposing the SDI video signal into bit slices and processing. In this case the number of bit slices for decomposing the SDI video signal is determined by the control of the synchronization control module; the number of bit slices can be different for Y component and C component, or the number can be the same regardless of Y and C components. The information on the decomposition (the number of bit slices) recorded in the IP packet header can be sent.

The IP conversion part (112) of the preprocessing module (110) converts Y, Cb, Cr components or bit slice components decomposed by the SDI signal decomposition part (111) into IP packets. The converted data decomposed into Y, Cb, Cr components or bit slice components by the preprocessing module (110) are switched or routed with IP packets corresponding to each component respectively by the IP switching/routing module (120). The 12 G UHD-SDI is decomposed into 6 G-Y component and 6 G-C component and the 6 G-C component is decomposed again 3 G-Cb component and 3 G-Cr component so that they can be switched and routed with 10 G IP switching or routing module. Moreover, each bit slice can be separately switched or routed with 10 G IP switching or routing module. Since the video should be displayed through one output port though decomposed IP packets are switched or routed respectively, the switched or routed IP packets are integrated through the SDI component extraction part (131) and the SDI signal composition part (132) and then outputted externally.

The SDI component extraction part (131) of the post processing module (130) extracts Y, Cb, Cr components or bit slice components from the switched or routed IP packets by the IP switching/routing module (120). The extracted components are used to output SDI signal composed according to the synchronization control signal entered from the synchronization control module (140).

The SDI signal composition part (132) combines the extracted Y, Cb, Cr components or bit slice components obtained by the SDI component extraction part (131) into a SDI video signal format according to the synchronization control signal entered from the synchronization control module (140), and outputs the SDI video signal to the SDI port of a video display device (300) connected to the SDI signal composition part.

Since SDI format video signals are decomposed and processed in IP packets, and combined again into SDI format video signals and outputted in the IP switching/routing apparatus through separate processing of SDI format video signals in accordance with the present invention, the corresponding signals should be processed in synchronization with each other. If not synchronized, the final switched/routed SDI video signal cannot be displayed in a displaying device or an output device.

The synchronization control module (140) can be equipped in the IP switching/routing apparatus through separate processing of SDI format video signals, or implemented as a separate node on the network. In any case, the synchronization control module (140) extracts synchronization signal (Vsync, Hsync, etc) from the input SDI video signal, and is desirable to identify the color format or the encoding standard for the corresponding video signal in order to output the entered SDI video signal exactly by decomposing and composing accordingly based on the synchronization signal.

The synchronization signal comprises basic clock signal and extracted signal using all the information required for decomposing and composing SDI signal including vertical sync (Vsync), horizontal sync (Hsync), active video section, blank section, color format, bit rate of serial data.

In addition, the IP packet conversion can additionally include specific information on a video source device (200) providing the video and a video display device (300) as the destination of the video.

Figure 4:
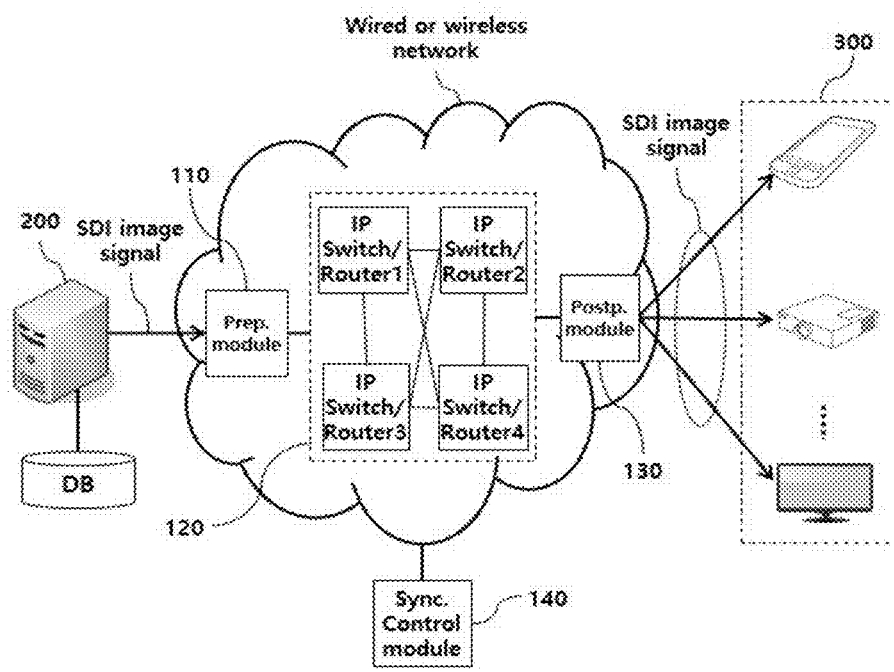
FIG. 4 is a block diagram for displaying separate processing using wired and wireless networks in modules of the IP switching/routing apparatus through separate processing of SDI format video signals in accordance with an embodiment of the present invention.

FIG. 4 is a block diagram for displaying separate processing using wired and wireless networks in modules of the IP switching/routing apparatus through separate processing of SDI format video signals in accordance with an embodiment of the present invention.

Each module of the IP switching/routing apparatus through separate processing of SDI format video signals can be implemented into one appliance as shown in FIG. 3; however, as shown in FIG. 4, it is possible that the preprocessing module (110), the IP switching/routing module (120), the post processing module (130), and the synchronization control module (140) comprise a distributed system to perform switching or routing through wired and wireless networks.

For example, the preprocessing module (120) connected to one of video source devices, UHD broadcasting server (200), decomposes YCbCr video information comprising the output SDI video signal of the UHD broadcasting server (200) into Y component and C component or multiple bit slices; converts the decomposed video components to IP packets, respectively; and transmits the IP packets to the IP switching/routing module (120) through wired and wireless networks so as to send a broadband signal to the post processing module by distributed processing of multiple narrow band signals.

The decomposition and conversion is carried out based on the received synchronization control signal from the synchronization control module (140) through wired and wireless networks.

The preprocessed IP packets by the preprocessing module (110) are switched or routed in a distributed way through the IP switching/routing module (120) consisting of at least one of IP switch or router connected with each other. For example, if the SDI video signal received from the UHD broadcasting server (200) is 12 G UHD-SDI, the preprocessing module (110) decomposes 6 G Y component, 3 G Cb component, 3 G Cr component or multiple bit slices; the components are converted into IP packets and then sent to the group of IP switching/routing modules (120), a mesh network, through wired and wireless networks; then they are distributed to each IP switch/router comprising the IP switching/routing modules (120) according to the bandwidth and the status of each IP switch/router.

For example, in case that IP switch/router 1 has 10 G bandwidth and IP switch/router 2 and IP switch/router 3 have 5 G bandwidth, respectively; then IP packets corresponding to the Y component are switched or routed by the IP switch/router 1 and IP packets corresponding to the Cb and Cr components are switched or routed by the IP switch/router 2 and the IP switch/router 3. If the IP switch/router 3 is out of order or unable to switch or route data to other IP switches/routers, IP packets corresponding to the Cr component can be switched or routed by IP switch/router 4. As such, multiple parallel switching or routing is performed in synchronization based on the synchronization control signal by the synchronization control module (140).

The post processing module (130) extracts the SDI signal components from the switched or routed IP packets; the extracted components are combined into a SDI video signal format based on the synchronization control signal received from the synchronization control module (140). The synchronization control module (140) composes a SDI video signal format based on the extracted synchronization signal at the time of SDI video signal input and the information on color format and outputs the signal to a video displaying device (300) including portable device such as smartphone, projector, and monitor (display) through a SDI port.

Figure 5:
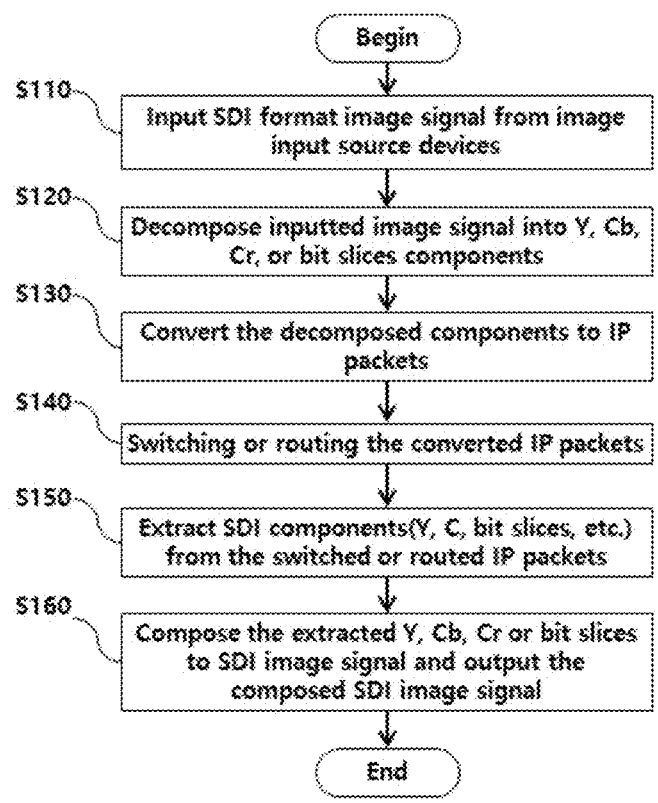
FIG. 5 is a flow diagram for displaying the operational process of the IP switching/routing apparatus through separate processing of SDI format video signals in accordance with an embodiment of the present invention.

FIG. 5 is a flow diagram for displaying the operational process of the IP switching/routing apparatus through separate processing of SDI format video signals in accordance with an embodiment of the present invention.

Referring to FIG. 1 to FIG. 5, ultra-high definition digital video is firstly received at the preprocessing module (110) from the video source device (200) such as video camera, broadcasting transmitter, broadcasting server, or digital multimedia editing device through a SDI interface (S110), the SDI signal decomposition part (111) of the preprocessing module (110) decomposes YCbCr signal of the SDI video signal into Y component and C component or multiple bit slices (S120).

The IP conversion part (112) of the preprocessing module (110) converts the decomposed Y, Cb, Cr components or bit slice components by the SDI signal decomposition part (111) to IP packets respectively. After converting IP packets, IP packets corresponding to Y, Cb, Cr or bit slice components are switched or routed respectively and then the video signal of Y, Cb, Cr or bit slice components are extracted and the SDI video signal is combined and outputted from the extracted components. At this time, the synchronization control signal received from the synchronization control module (140) is used to combine and output the SDI video signal. In addition, specific information on a video source device (200) providing the video and a video display device (300) as the destination of the video can be included additionally in the transferred IP packets to during the IP packet conversion process (S130).

Next, the data decomposed into Y, Cb, Cr or bit slice components and converted to IP packets by the preprocessing module (110) are switched or routed according to decomposed packets corresponding to Y, Cb, Cr or bit slice components respectively by the IP switching/routing module (120) (S140). The decomposed IP packets are switched or routed separately but the SDI video signal is combined and outputted according to the destination address of the IP packets since the video signal should be transferred through one output port.

Then the SDI component extraction part (131) of the post processing module (130) extracts again the video signal components corresponding to Y, Cb, Cr or bit slice from the switched or routed IP packets by the IP switching/routing module (120) (S150).

The SDI signal composition part (132) combines Y, Cb, Cr or bit slice components restored by the SDI component extraction part (131) according to the synchronization control signal received from the synchronization control module (140) and outputs to SDI output port (S160).

As described earlier, the IP switching/routing apparatus through separate processing of SDI format video signals and the method thereof in accordance with an embodiment of the present invention are explained in detail.

As investigated previously, the present invention relates to an apparatus for IP switching/routing video signals through separate processing of SDI format video signals and the method thereof, which processes a large bandwidth UHD video with general-purpose IP switches or routers having less bandwidth by decomposing a video signal consisting of YCbCr type color format entered with SDI into Y component and C component, converting the components into IP packets and performing switching or routing of packets, extracting Y component and C component from switched or routed IP packets, and combining the components into SDI format video signal and outputting the combined video signal so as to significantly lower the capital expenditure on constructing the infrastructure for processing ultra-high definition (UHD) video and the provision system.

In addition, the present invention maximizes the usage rate of the previously constructed network infrastructure since the broadband ultra-high definition (UHD) video service can be provided with the network infrastructure having a processing capacity of lower bandwidths.

Figure 6:
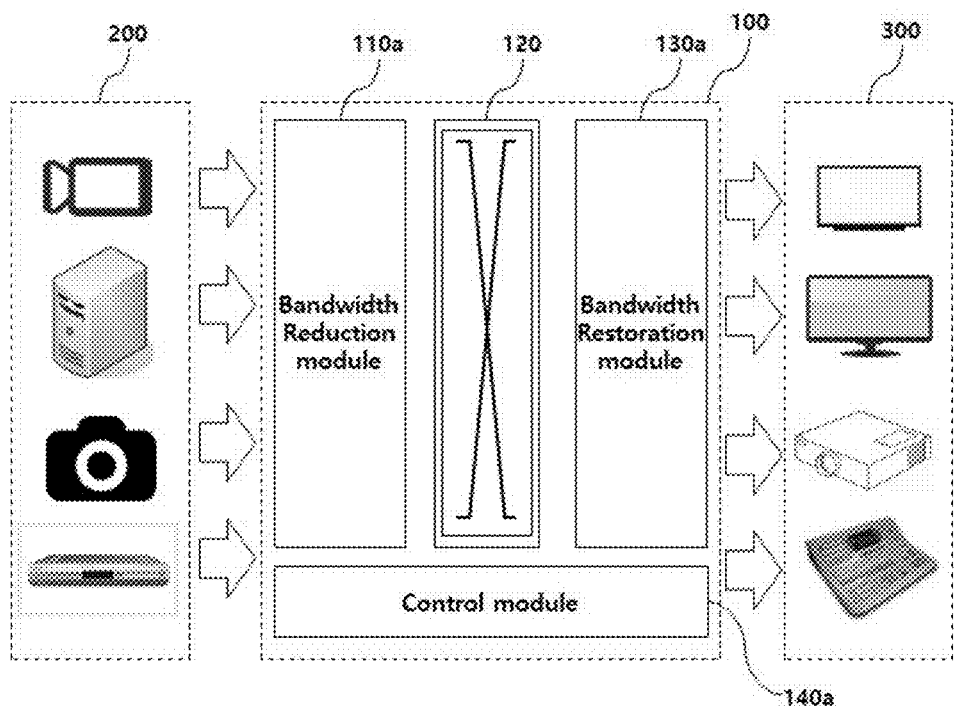
FIG. 6 is a conceptual diagram for explaining the operations of the IP switching/routing apparatus through bandwidth splitting and reduction of SDI format video signals in accordance with an embodiment of the present invention.

FIG. 6 is a conceptual diagram for explaining the operations of the IP switching/routing apparatus through bandwidth reduction and restoration of SDI format video signals in accordance with an embodiment of the present invention.

As shown in FIG. 6, the operations of the grid based IP switching/routing apparatus through bandwidth reduction and restoration of SDI format video signals are made such that if a (ultra-) high definition digital video recorded by a video source device (200) such as a video camera, a broadcasting transmitter, a broadcasting server, a digital multimedia editor, a video recorder, or etc. is entered through SDI to the IP switching/routing apparatus through separate processing of SDI format video signals (100), the bandwidth reduction module (110) separates the video signal consisting of YCbCr type color format (e.g. 4:2:0, 4:2:2, 4:4:4, or etc.) into Y component and C component; and the decomposed Y component and C component are converted into IP packets, respectively. By this process, the traffic of large volume videos having large bandwidths is broken up into small traffic of multiple videos requiring half or less bandwidths; the reduced traffic is processed in a distributed way through multiple switches or routers based on grid concept, combined again in SDI format and outputted.

For example, data processing with 12 Gbit per second is required for the case of 12 G UHD-SDI; when the data configuration of Y:Cb:Cr comprising the color format of 12 G UHD-SDI video signal is 4:2:2, it is decomposed into Y component of 6 Gbit/s and C component if the data is decomposed into Y and C components. Moreover, the C component is further decomposed into 3 Gbit/s Cb component and 3 Gbit/s Cb component. In addition, it is possible to divide 10-bit Y-pixel of 6 G-Y component in 12 G UHD-SDI into 5 bit-slices of 2 bits and to assign and process 1.2 G traffic to each bit-slice. To use 10 bit-slices of 1 bit is also possible. In case that it is improper to divide 6 G Y component into 6 bit-slices of 1 G, then 12 slices of 0.5 G traffic can be made and processed to use conventional network infrastructure.

To reduce the bandwidth of large volume ultra-high definition video, the decomposed data as such are further compressed by applying discrete cosine transform (DCT), converting the color format Y:Cb:Cr, 4:2:2, to 4:2:0, or applying bit-slice truncation by expunging the least significant bit (LSB) part, 1 to 2 bits, of C component so as to reduce the bandwidth of 12 Gbit/s to less than 10 Gbit/s.

If the data for each decomposed and reduced video signal component are then converted to IP packets and switched or routed, the processing capacity of switch or router can be reduced as much. In other words, multiple switches and routers having less processing capacity can process data requiring high processing capacity without a problem.

The data decomposed Y component and C component by the bandwidth reduction module (110a) and converted into IP packets after reducing the bandwidth is switched or routed by the IP switching/routing module (120). Since the 12 G UHD-SDI, for example, is decomposed into 6 G-Y component, 3 G-Cb component, and 3 G-Cr component, compression, color format conversion, bit-slice reduction is used to reduce bandwidths resulting in Y component of less than 5 G, Cb component of less than 2.5 G, and Cr component of less than 2.5 G so that IP switches or routers having 5 G capacity can efficiently process videos of large volume data more than 10 G. If the bandwidth decomposition and reduction are not used, it is required to use SDI dedicated switches or routers more than 40 G bandwidth in order to switch or route 12 G UHD-SDI video data, which results in the increase of expenditure on constructing network infrastructure.

The IP switching/routing module (120) is equipped with switching fabric and performs switching function by mapping source and destination addresses based on the switching or routing table controlling the switching or routing. The functions provided by conventional switches or routers can be used for hardware and software functions of switching or routing.

The switched or routed IP packets by the IP switching/routing module (120) are converted by the bandwidth restoration module (130a) into Y, Cb, Cr video signal components, composed into SDI video format, and transmitted to the video displaying device (300) such as monitor, TV, projector, video editing appliance, display or broadcasting receiver.

The synchronization among video signals is necessarily required in decomposing the SDI video signal into Y, Cb, Cr video signal components or composing vice versa with the bandwidth reduction module (110a) and the bandwidth restoration module (130a).

In other words, the control module (140a) provides synchronization signal required for decomposition of Y and C components and conversion of IP packets by the bandwidth reduction module (110a), switching or routing process by the IP switching/routing module (120), or extraction of Y and C components from IP packets and composition of SDI signal with the Y and C components by the bandwidth restoration module (130a) so that the video can be seamlessly decomposed and converted, switched, or routed throughout the whole system.

In addition, the present invention can be implemented in a configuration without requiring additional control signal or synchronization signal, in which the SDI video signal is decomposed and reduced, then integrated and converted to IP packets, and transmitted through a packet network; the reduced and decomposed information is extracted from the corresponding packets at the desired destination, and the video signal is restored and outputted after integration.

Figure 7:
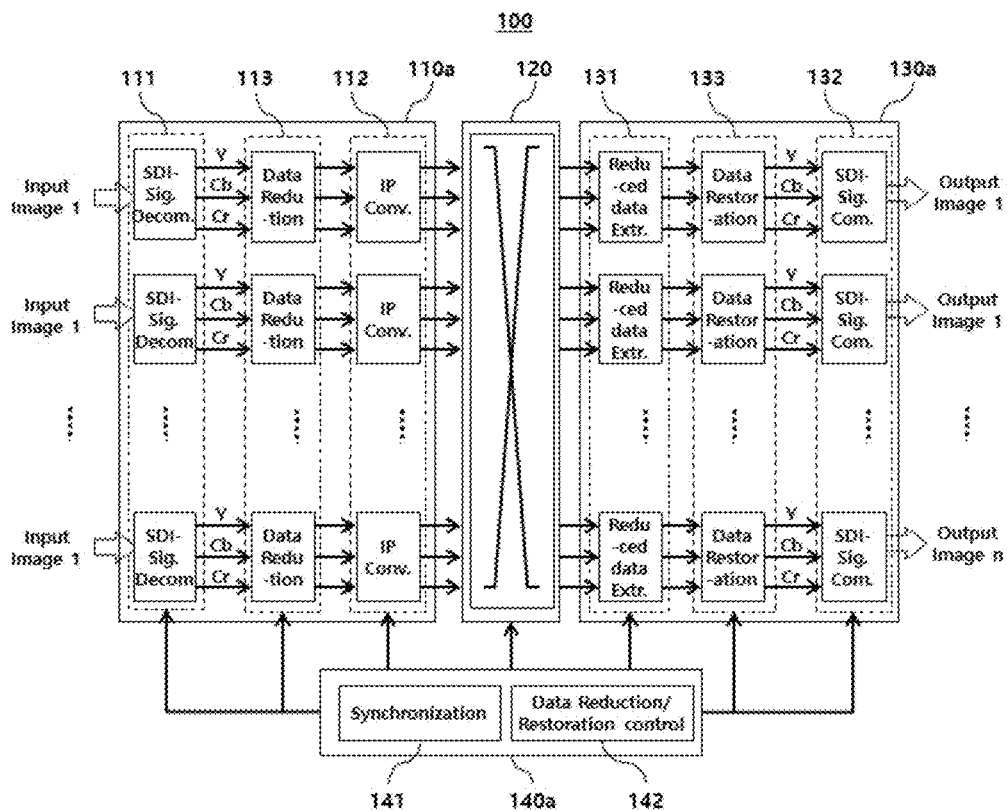
FIG. 7 is a block diagram for displaying the detailed configuration of the IP switching/routing apparatus through bandwidth splitting and reduction of SDI format video signals in accordance with an embodiment of the present invention.

FIG. 7 is a block diagram for displaying the detailed configuration of the IP switching/routing apparatus through bandwidth reduction and restoration of SDI format video signals in accordance with an embodiment of the present invention.

As shown in FIG. 7, the grid based IP switching/routing apparatus through bandwidth reduction of SDI format video signals comprises including a bandwidth reduction module (110a), an IP switching/routing module (120), a bandwidth restoration module (130a), and a control module (140a); the bandwidth reduction module (110a) comprises including a SDI signal decomposition part (111), a data reduction part (113) and an IP conversion part (112); the bandwidth restoration module (130a) comprises including a reduced data extraction part (131), a data restoration part (133) and a SDI signal composition part (132); and the control module (140a) comprises including a synchronization part (141) and a data reduction/restoration control part (142).

The SDI signal decomposition part (111) of the bandwidth reduction module (110a) receives SDI format ultra-high definition digital videos from more than one (n) video source devices (200). The received SDI signal consists of 4:2:0, 4:2:2, or 4:4:4 color format. The SDI signal decomposition part (111) decomposes the SDI video signal into Y component and C component. If the SDI signal is 12 G UHD-SDI (4:2:2), it is decomposed into 6 G-Y component, 3 G-Cb component, and 3 G-Cr component, respectively. In this process, the decomposition of Y, Cb, Cr components is carried out by decoding the 12 G UHD-SDI encoded in SDI format; the synchronization part (141) of the control module (140a) extracts a synchronization signal, and the SDI signal decomposition part, the data reduction part, the IP conversion part, the reduced data extraction part, the data restoration part, and the SDI signal composition part perform their functions based on the extracted synchronization signal.

The SDI signal decomposition part (111) in the bandwidth reduction module (110a) includes further a function of processing the received SDI video signal divided in bit slices. In this case, the data reduction/restoration control part (142) in the control module (140a) determines the number of bit slices for dividing the SDI video signal; the number of bit slices can be different for Y component and C component, or the number can be the same regardless of Y and C components. The information on the decomposition (the number of bit slices) recorded in the IP packet header can be sent.

The data reduction part (113) performs compression or encoding of Y component and C component or bit-slices decomposed by the SDI signal decomposition part (111) with at least one of 1-D DCT, quantization, scan, RLC (Run Length Coding), VLC (Variable Length Coding) or etc., conversion of color format, 4:2:2, to 4:2:0, or bit-slice truncation by expunging the least significant bit (LSB) part, 1 to 2 bits, of C component so as to reduce the large bandwidth ultra-high definition video data. The compression, color format conversion, bit-slice truncation are carried out based on the control signal provided by the data reduction/restoration control part (142) according to the synchronization signal provided by the synchronization part (141) in the control module (140a). In other words, the data reduction/restoration control part (142) in the control module (140a) determines which method of data reduction (compression, color format conversion, or bit-slice truncation) is used considering the data size of received ultra-high definition video and the allowable capacity of the IP switching/routing module (120). In addition, the data reduction/restoration control part (142) determines further whether, in the compression process, 1-D DCT is applied, quantization is also applied, RLC is applied after scan, or VLC is applied; the synchronization signal of the synchronization part (141) will be different depending on the determination. In addition, the compression, the color format conversion, or the bit-slice truncation is differently applied to Y component and C component or bit-slice, respectively.

The DCT is 2-dimensional process in which discrete cosine transform is applied horizontally and then another discrete cosine transform is applied vertically to the values obtained from horizontal DCT; 8×8 DCT is used for MPEG, H.262, and H.263 and 4×4 DCT is also used for H.264. In case that the conventional method is used, the latency is increased accordingly though the compression efficiency is increased since the transform is applied to 8×8 or 4×4 blocks.

To solve this problem, the present invention is configured consisting of the data reduction part (113) performing one-dimensional DCT only so that the latency is reduced instead though the compression efficiency is low compared with two-dimensional DCT. In addition, the size of one-dimensional DCT (16, 32, etc.) can be determined and one-dimensional wavelet transform can be used. If 2-D DCT is applied depending on a user's needs, it is desirable to use 16×4 or 16×2 block sizes of DCT to reduce latency while increasing compression efficiency. In addition, one-dimensional wavelet transform is desirable but it is desirable to use smaller horizontal block size than the vertical block size to reduce latency in case of 2-D wavelet transform.

The coefficients obtained from DCT in the data reduction part (113) are large at low frequency (i.e. the energy is concentrated in low frequency bands). The quantization is then applied and the previously developed quantization step sizes for MPEG-1 or MPEG-2 can be used. Then scanning (zigzag or alternate scanning) is applied to the quantized data and RLC (a lossless coding technique in which the length of 0's and the data other than zero is sent because the coefficients after applying DCT and quantization have consecutive 0's) or VLC (a lossless coding technique in which a short codeword is used for data with high probability and a long codeword is used for data with low probability because the energy of data is concentrated after applying DCT) is additionally applied so as to increase compression efficiency. Here DCT, quantization, scan, RLC, or VLC can be applied partly or selectively for video data compression and differently applied to Y component and C component. The component to compress and the compression method can be determined by the user's selection or the automatic control of the data reduction/restoration control part (142) in the control module (140a) considering the data size of received video and the allowable capacity of the IP switching/routing module (120).

The information on the data reduction is added to the IP packet header so that the IP header is used as a reference when the data is restored after performing IP switching or routing.

Furthermore, the data reduction/restoration control part (142) can control by assigning the corresponding data reduction and restoration condition.

Figure 8:
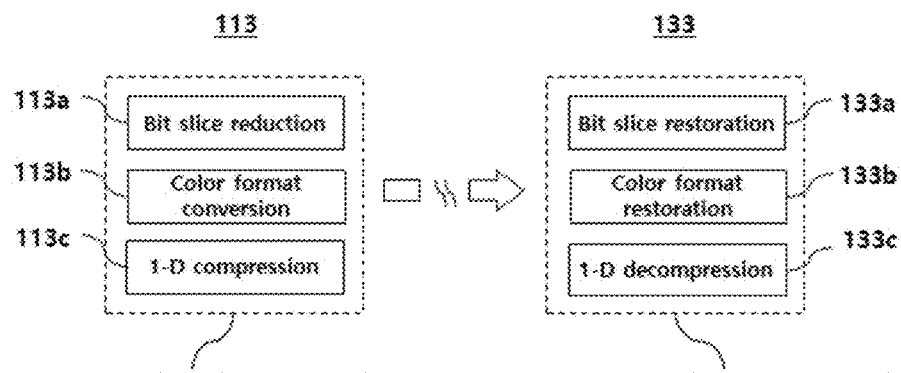
FIG. 8 is a block diagram for displaying the detailed configuration of bandwidth splitting and reduction of SDI format video signals in accordance with an embodiment of the present invention.

FIG. 8 is a block diagram for displaying the detailed configuration of bandwidth reduction and restoration of SDI format video signals in accordance with an embodiment of the present invention.

As shown in FIG. 8, the data reduction part (113) and the data restoration part (133) in the present invention are explained in detail.

Firstly, the data reduction part (113) comprises including a bit slice reduction part (113a), a color format conversion part (113b), and a one-dimensional compression part (113c). The one-dimensional compression part utilizes 1-D DCT or DWT and quantization, scan, RLC, VLC or the combinations thereof is included in addition. Moreover, RLC or VLC only can be used. An important technical feature in the present invention is to use one-dimensional compression algorithm although any compression algorithms can be used. Additionally, in case that two-dimensional compression algorithm is used, it is desirable to use a larger horizontal block size than vertical block size. It is also desirable that the compression performance or latency is selectively determined by the user's decision or the implemented setup of the IP switching/routing apparatus (100) in accordance with the present invention considering network condition.

The bit slice reduction part (113a) can expunge some part of least significant bit (LSB) of Cb or Cr color values so as to send large bandwidth video signals with switches or routers having low bandwidths.

The color format conversion part (113b) converts the received SDI color format of 4:4:4 or 4:2:2 to the reduced data color format like 4:2:0 so as to process large bandwidth video signals while occupying less bandwidths. In this case the video quality is deteriorated in some degree.

The one-dimensional compression part (113c) performs 1-D DCT, 1-D DWT, quantization, scan, RLC, or VLC. It is possible to configure performing 1-D DCT or 1-D DWT only, and applying quantization in addition or applying selectively scan, RLC, or VLC. Here two-dimensional DCT consists of two 1-D DCT and a transposition between two 1-D DCT; in case of two-dimensional DCT, it is desirable to use larger horizontal block size than vertical block size to reduce processing delay, or latency.

Moreover, the data restoration part (133) comprises including a bit slice restoration part (133a), a color format restoration part (133b), and a one-dimensional restoration part (133c) (VLD, RLD, inverse scan, inverse quantization, 1-D IDCT, 1-D IDWT). Since the operations of the data restoration part (133) is the reverse process of the data reduction part (113), it is desirable to perform the restoration according to the control of the data reduction/restoration control part (142) in the IP switching/routing apparatus (100) in accordance with the present invention or the parameters added in the IP packet header.

The bit slice restoration part (133a) performs stuffing 0 into some part of LSB in Cb or Cr color values or restoring the expunged bits by interpolating undeleted bits. In addition, bit error recovery methods can be used in this case. That is the expunged bit slices are assumed to be errors and recovery algorithms are used to restore the corresponding bits.

The color format restoration part (133b) restores 4:4:4 or 4:2:2 format videos for the original SDI input from 4:2:0 or 4:2:2 format videos. If needed, this restoration process can be omitted and the received video is outputted. In this case, the receiver can recognize the received video signal of the corresponding color format.

The corresponding inverse process (VLD, RLD, inverse scan, inverse quantization, 1-D IDCT, and 1-D IDWT) is selectively performed in proportion to the applied compression at the data reduction part (113) so as to restore the compressed data.

Figure 9:
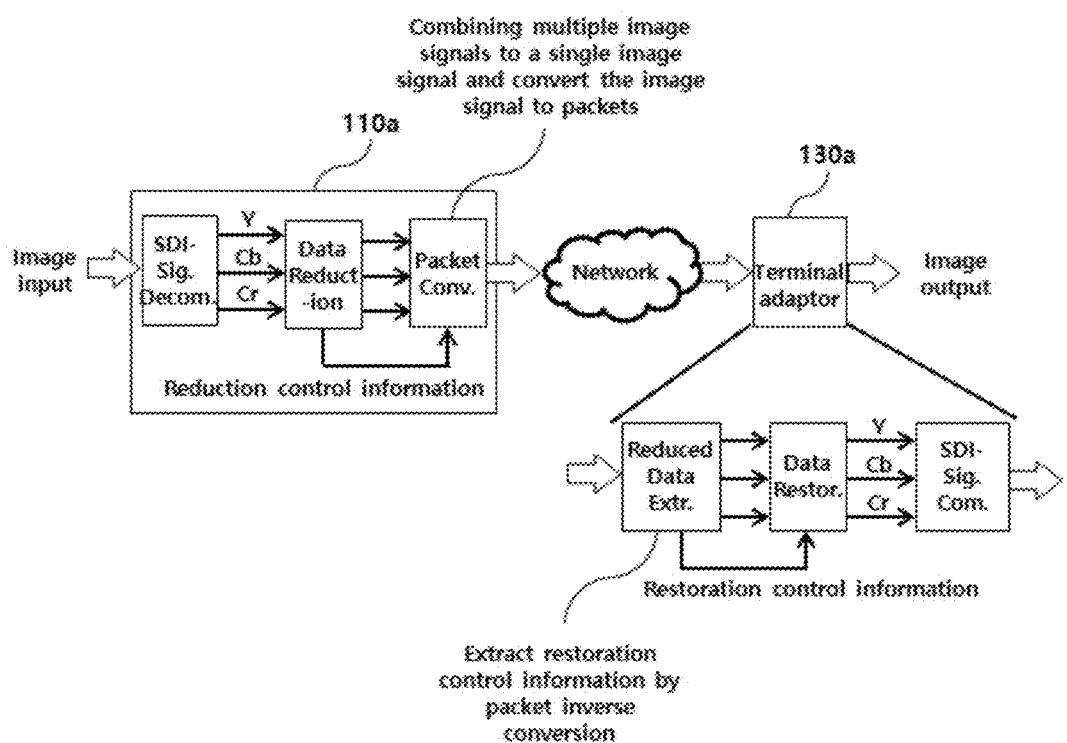
FIG. 9 is a block diagram for displaying the detailed configuration of a packet switching/routing apparatus without requiring additional synchronization and control for data compression and restoration through bandwidth splitting and reduction of SDI format video signals in accordance with an embodiment of the present invention.

FIG. 9 is a block diagram for displaying the detailed configuration of a packet switching/routing apparatus without requiring additional synchronization and control for data reduction and restoration through bandwidth reduction and restoration of SDI format video signals in accordance with an embodiment of the present invention.

As shown in FIG. 9, the present invention eliminates separate means for synchronization and control of data reduction and restoration; if packets containing the corresponding information are sent to a destination by switching and routing, the original synchronization and control information is restored at the destination using the information contained in the packets.

Firstly, compared with the bandwidth reduction module (110a) in FIG. 7, the data separated at the SDI signal decomposition part (111) and compressed at the data reduction part (113) is combined again into one and then converted to packets and transmitted while the separated and compressed data are converted into packets respectively and transmitted at the packet conversion part (112). During this process, the reduction control information at the data reduction part (113) can be included in packet headers or specific data fields and transmitted at the packet conversion part (112).

Next, the receiver side receiving the packets through a network is provided with SDI signal through the device adaptor (130a). The device adaptor (130a) is also called as the bandwidth restoration module (130a) and specifically performs the reverse process of data reduction.

The bandwidth restoration module (130a) extracts the restoration control information by applying reverse processing, performs data restoration using the corresponding information, and combines restored Y, Cb, Cr into SDI signal and outputs. The device adaptor performing this process can be used at the receiving side of the video signal.

Throughout this specification, IP switching/routing is used to describe the present invention but IP packet is used as an embodiment of the present invention for the convenience of explanation only; the present invention is not limited to IP switching/routing but includes ATM or data frame traffic, too.

Figure 10:
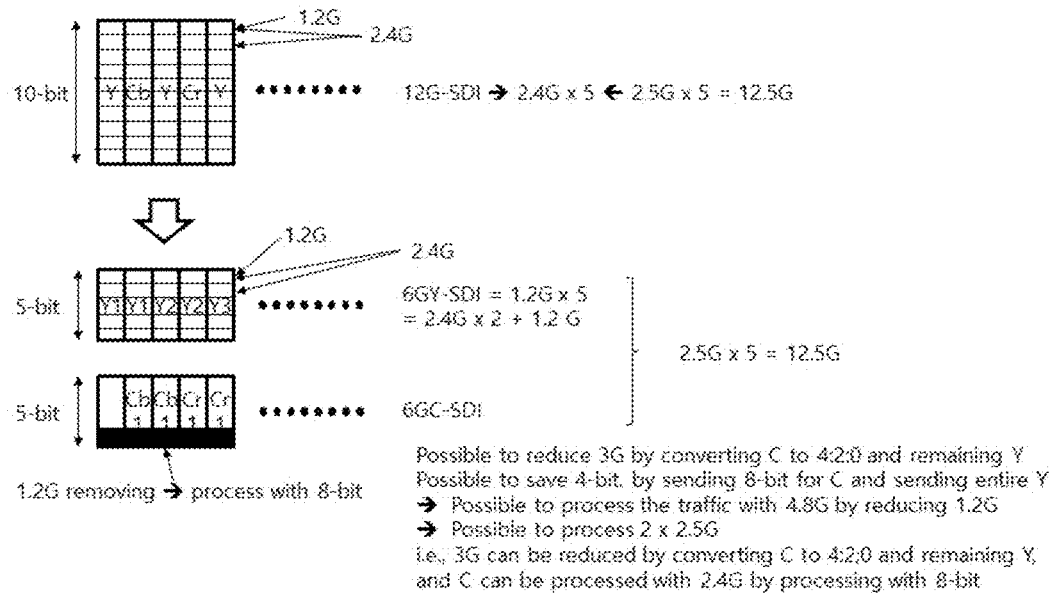
FIG. 10 is a conceptual diagram for describing the concept of bandwidth reduction in the grid based IP switching/routing apparatus through bandwidth reduction of SDI format video signals in accordance with an embodiment of the present invention.

FIG. 10 is a conceptual diagram for describing the concept of bandwidth compression in the grid-based IP switching/routing apparatus through bandwidth reduction of SDI format video signals in accordance with an embodiment of the present invention.

As shown in FIG. 10, the data reduction part (113) decreases large volume video data to relatively small volume data by applying color format conversion and bit slice truncation in addition to the compression process. For example, when the Y:Cb:Cr color format of 12 G UHD-SDI separated by the SDI signal decomposition part (111) is 4:2:2, the bandwidth of 3 Gbit/s can be reduced if the 6 G-Y component is maintained as it is and the 6 G-C component is converted to 4:2:0 color format; large volume data videos more than 10 G can be efficiently processed with IP switches or routers having bandwidths less than 10 Gbit/s.

In addition, if the Y component is maintained and the bit slice truncation is applied to the LSB (least significant bit) 2 bits of the C component, total 8 bits are transmitted and 4 bits are saved; thus the bandwidth of C component is reduced by 1.2 Gbit/s and it has 4.8 Gbit/s bandwidth; if Cb and Cr components having 2.4 Gbit/s respectively are used, two IP switches or routers of 2.5 Gbit/s bandwidth can be used to perform switching or routing.

If the color format conversion to 4:2:0 and the bit slice truncation of 2 bits are used, the C component has 2.4 Gbit/s bandwidth and thus can be switched or routed with one IP switch or router of 2.5 Gbit/s bandwidth.

Hereinafter the rest of FIG. 7 is explained further.

The IP conversion part (112) in the bandwidth reduction module (110a) converts Y, Cb, Cr or bit slice components as decomposed and compressed SDI data by the SDI signal decomposition part (111) and the data reduction part (113) to IP packets. After converting to IP packets, the IP packets corresponding to the compressed Y, Cb, Cr or bit slice components are respectively switched or routed; the compressed Y, Cb, Cr or bit slice components are extracted again from the IP packets by the SDI signal extraction part (131); Y, Cb, Cr components are restored from the extracted components by the data restoration part (133); and the SDI format video signal is combined and transmitted by the SDI signal composition part (132). This process is controlled by the synchronization part (141) and the data reduction/restoration control part (142) in the control module (140a). In addition, the IP packet conversion can additionally include specific information on a video source device (200) providing the video and a video display device (300) as the destination of the video.

For example, a 12 G UHD-SDI is decomposed into 6 G-Y component and 6 G-C component and the 6 G-C component is decomposed again 3 G-Cb component and 3 G-Cr component so that they can be switched and routed with 10 G IP switching or routing module. Moreover, each bit slice can be separately switched or routed with 10 G IP switching or routing module. Since the video should be displayed through one output port though separately decomposed IP packets are switched or routed respectively, the switched or routed IP packets are integrated through the SDI component extraction part (131) and the SDI signal composition part (133) and then outputted externally.

The compressed data extraction part (131) of the bandwidth restoration module (130a) extracts Y, Cb, Cr components or bit slice components from the switched or routed IP packets by the IP switching/routing module (120). The compressed data is the output obtained by applying compression, color format conversion, or bit slice truncation to Y, Cb, Cr components or bit slice components.

The SDI signal composition part (132) combines the extracted Y, Cb, Cr components or bit slice components obtained by the data restoration part (133) into a SDI video signal format according to the synchronization control signal entered from the synchronization control module (140a), and outputs the SDI video signal to the SDI port of a video display device (300) connected to the SDI signal composition part.

If the data is compressed with 1-D DCT, 1-D DWT, quantization, RLC, VLC, or etc. by the data reduction part (113), the data restoration part (133) restores the original data in accordance with the synchronization signal by the synchronization part (141) in the control module (140*a*), following the control signal of the data reduction/restoration control part (142), or based on the compression information contained in IP packet header.

The compression information includes how DCT, quantization, RLC, or VLC are used and how the compression methods are applied to Y component and C component or bit-slice, respectively.

If the Y component is not compressed and at least one of 1-D DCT, 1-D DWT, quantization, RLC, or VLC is applied to the C component only by the data reduction part (113), the data restoration part (133) restores the original video data by applying at least one of 1-D IDCT (Inverse Discrete Cosine Transform), 1-D IDWT (Inverse Discrete Wavelet Transform), inverse quantization, RLD (Run Length Decoding), or VLD (Variable Length Decoding) to the C component.

Likewise, if the data reduction part (113) uses color format conversion, the data restoration part (133) restores the compressed data by obtaining the conversion information from IP packet header or the control signal from the data reduction/restoration control part (142). In addition, if some part of bit slices is eliminated, the data restoration part (133) restores the compressed data by stuffing zeros or applying error correction methods.

The SDI signal composition part (132) combines the extracted Y, Cb, Cr components or bit slice components restored by the data restoration part (133) into a SDI video signal format according to the synchronization signal received from the synchronization part (141) in the control module (140*a*), and outputs the SDI video signal to the SDI port of a video display device (300).

The grid based IP switching/routing apparatus through bandwidth reduction of SDI format video signal in accordance with an embodiment of the present invention decomposes SDI format video signal and reduces the bandwidth; converts it into IP packets and performs switching or routing of packets; the bandwidth of the video signal is restored and combined into SDI format video signal and outputted; so the processing should be performed in synchronization with the corresponding signals in all steps. If not processed in a synchronous way, the last switched/routed SDI video signal cannot be displayed at a display or an output device.

The synchronization control module (140*a*) can be equipped in the IP switching/routing apparatus through separate processing of SDI format video signals, or implemented as a separate node on the network. In any case, the synchronization part (141) of the control module (140*a*) extracts synchronization signal (Vsync, Hsync, Framesync, etc) from the input SDI video signal, and is desirable to identify the color format or the encoding standard for the corresponding video signal in order to output the entered SDI video signal exactly by decomposing and composing accordingly based on the synchronization signal.

The data reduction/restoration control part (142) in the control module (140*a*) determines data compression method (DCT, quantization, RLC, VLC, or the combinations thereof) for video data compression considering the data size of video and the allowable capacity of the IP switching/routing module (120). In addition, it controls the data reduction part (113) to apply the data compression methods differently to Y component and C component.

Figure 11:
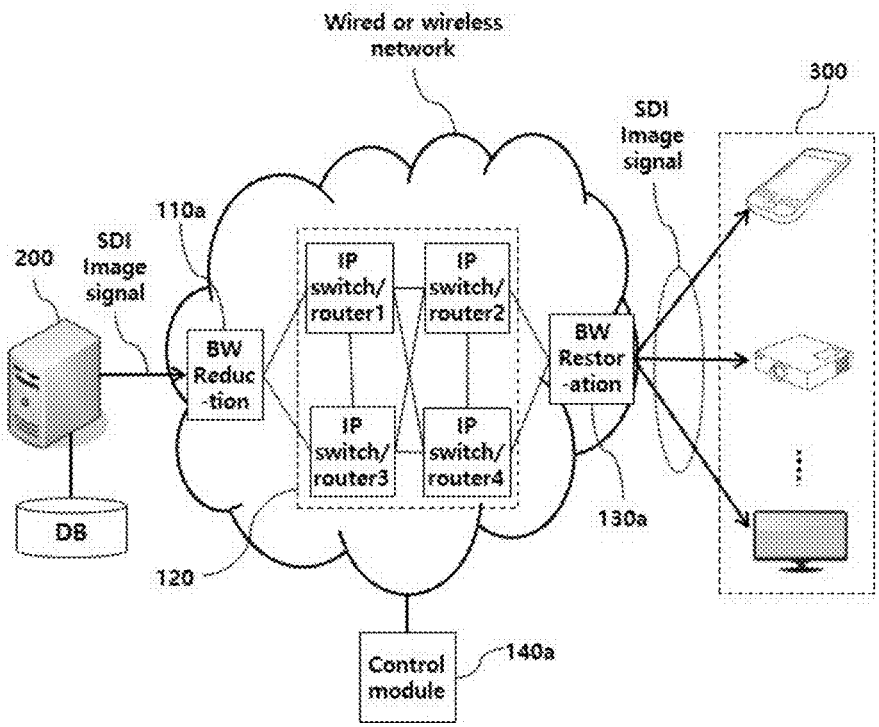
FIG. 11 is a block diagram for displaying separate processing using wired and wireless networks, and composing and outputting SDI format video signals in modules of the grid based IP switching/routing apparatus through bandwidth reduction of SDI format video signals in accordance with an embodiment of the present invention.

FIG. 11 is a block diagram for displaying separate processing using wired and wireless networks, and composing and outputting SDI format video signals in modules of the grid-based IP switching/routing apparatus through bandwidth reduction of SDI format video signals in accordance with an embodiment of the present invention.

Each module of the grid-based IP switching/routing apparatus through separate processing of SDI format video signals can be implemented into one appliance as shown in FIG. 7; however, as shown in FIG. 6, it is possible that the bandwidth reduction module (110*a*), the IP switching/routing module (120), the bandwidth restoration module (130*a*), and the control module (140*a*) comprise a distributed system to perform switching or routing through wired and wireless networks. In addition, as shown in FIG. 9, an embodiment of the present includes a case in which the SDI signal is decomposed, and the data is compressed and transmitted through a network. In this case, separate control module is not required.

For example, the bandwidth reduction module (110*a*), connected to one of video source devices, UHD broadcasting server (200), decomposes YCbCr video information comprising the SDI video signal outputted by the UHD broadcasting server (200) into Y component and C component or multiple bit-slices; performs bandwidth reduction process in which the data is compressed and converted to IP packets; the bandwidth reduced data is transmitted to the IP switching/routing module (120) through wired and wireless networks. According to this method, one broadband signal is transmitted to the bandwidth restoration module (130*a*) in forms of multiple narrow-band signals relative to the original signal by distributed processing. Decomposition of the video signal, data compression and conversion are performed according to the synchronization signal and control signal transferred through wired and wireless networks by the control module (140*a*).

The bandwidth reduced IP packets by the bandwidth reduction module (110*a*) are switched or routed in distributed way by the IP switching/routing module (120) consisting of at least one of IP switches and routers mutually connected through wired and wireless networks For example, in case that the SDI video signal outputted by the UHD broadcasting server (200) is a 12 G UHD-SDI signal, the bandwidth reduction module (110*a*) decomposes the signal into 6 G Y component, 3 G Cb component, and 3 G Cr component or multiple bit-slices, and reduces the bandwidths to Y component of less than 5 G, Cb component of less than 2.5 G, and Cr component of less than 2.5 G by applying DCT, DWT, quantization, RLC, VLC, or the combinations thereof to each component respectively; additionally, the bandwidth of 12 G UHD-SDI consisting of 4:2:2 color format of Y:Cb:Cr can be reduced by 3 Gbit/s by maintaining 6 G-Y component and converting 6 G-C component to 4:2:0 color format, and reduced to Cb and Cr components of 2.4 Gbit/s by applying bit-slice truncation to the C component. Furthermore, Cb and Cr components are reduced to the bandwidths of 2.4 Gbit/s by color format conversion and bit-slice truncation.

Then the components are converted to IP packets and transmitted to a group (a mesh network) of IP switching/routing module (120) through wired and wireless network, each IP switch/router comprising the IP switching/routing module (120) switches or routes divided IP packets according to the switching/routing bandwidth and the status of each switch/router. For example, if the switching/routing bandwidth of the IP switch/router 1 is 5 G, and the bandwidths of the IP switch/router 2 and the IP switch/router 3 are 2.5 G respectively, IP packets corresponding to the Y component can be switched or routed with the IP switch/router 1 and IP packets corresponding to the Cb and Cr components are switched or routed with more narrow-band IP switches/routers depending on the degree of reduction with compression, color format conversion, or bit-slice truncation. The multiple parallel switching or routing is performed according to the synchronization signal provided by the synchronization part (141) in the control module (140a).

The switched or routed IP packets is restored with the bandwidth restoration module (130a) according to the synchronization signal and control signal provided by the control module (140a), by applying IDCT, inverse quantization, RLD, or VLD, extracting Y, Cb, Cr components from the restored video data, and combining and outputting the SDI video signal format. Here the control module (140a) restores Y, Cb, Cr components based on the synchronization signal extracted at the input time of SDI video signal and the information on compression, color format, and bit-slice truncation; combines the restored Y, Cb, Cr components into SDI video signal format; and outputs the SDI video signal to the SDI port of a video display device (300) including portable device such as smartphone, projector, and monitor (display).

FIG. 12 is a flow diagram for displaying the operational process of the grid based IP switching/routing apparatus through bandwidth reduction of SDI format video signals in accordance with an embodiment of the present invention.

Referring FIG. 6 to FIG. 12, ultra-high definition digital video is firstly received at the bandwidth reduction module (110a) from the video source device (200) such as video camera, broadcasting transmitter, broadcasting server, or digital multimedia editing device through a SDI interface (S1100), the SDI signal decomposition part (111) of the bandwidth reduction module (110) decomposes YCbCr signal of the SDI video signal into Y component and C component or multiple bit slices (S1200).

The decomposed Y component and C component in S1200 phase are compressed by applying 1-D DCT, quantization, RLC, VLC or etc., changing the color format, 4:2:2, to 4:2:0, or applying bit-slice truncation in which 1-2 bits in the LSB part of C component are removed so that large volume of video data is reduced to relatively small volume of video data (S1300).

The compression, color format conversion, or bit-slice truncation are performed in synchronization with the synchronization signal provided by the synchronization part (141) in the control module (140a) and the data reduction/restoration control part (142) in the control module (140a) determines which method of data reduction (compression, color format conversion, or bit-slice truncation) is used considering the data size of received ultra-high definition video and the allowable capacity of the IP switching/routing module (120). In addition, it is desirable to apply the data reduction methods differently to Y component and C component.

The IP conversion part (112) in the bandwidth reduction module (110a) compresses Y, Cb, Cr components or decomposed data in bit-slices and converts the compressed data into IP packets. The converted IP packets are switched or routed respectively and the original data is restored from the compressed data; Y, Cb, Cr components or video signal in bit-slices are extracted from the restored data; and the SDI video signal is combined and outputted from the extracted Y, Cb, Cr components. At this time the SDI video signal is combined and outputted according to the synchronization control signal provided by the control module (140a). In addition, the IP packet conversion can additionally include specific information on a video source device (200) providing the video and a video display device (300) as the destination of the video (S1400).

Next the data, decomposed into Y, Cb, Cr or bit slice components by the bandwidth reduction module (110a), data compressed and converted to IP packets, are switched or routed separately according to decomposed IP packets respectively by the IP switching/routing module (120) (S1500). The respective IP packets are switched or routed by grid based narrow-band switches or routers.

Then the compressed data extraction part (131) in the bandwidth restoration module (130a) extracts the compressed video data from the switched or routed IP packets by the IP switching/routing module (120) (S1600).

The compressed video data extracted by the compressed data extraction part (131) are used to restore the video data (S170a). The compressed data are restored with IDCT, inverse quantization, RLD, VLD, or the combinations thereof according to the synchronization signal and the control signal received from the control module (140a) (S1700). In addition, the original color format is restored when the color format is changed, and the bit-slice truncated video data are restored by stuffing the truncated bits.

The decomposed IP packets are switched or routed separately but the SDI video signal is combined and outputted according to the destination address of the IP packets since the video signal should be transferred through one output port.

The SDI signal composition part (132) combines the Y, Cb, Cr or bit slice video signal components restored by the data restoration part (133) into one SDI video signal format according to the synchronization signal provided by the synchronization part (141) in the control module (140a) and then outputs it to a SDI port of the video display device (300) (S1800).

As such, the IP switching/routing apparatus through bandwidth reduction of SDI format video signals and the method thereof in accordance with an embodiment of the present invention is explained in detail.

As investigated previously, the present invention relates to an apparatus for IP switching/routing video signals through separate processing of SDI format video signals and the method thereof, which processes a large bandwidth UHD video with general-purpose IP switches or routers having less bandwidth by decomposing a video signal consisting of YCbCr type color format entered with SDI into Y component and C component, converting the components into IP packets and performing switching or routing of packets, extracting Y component and C component from switched or routed IP packets, and combining the components into SDI format video signal and outputting the combined video signal so as to significantly lower the capital expenditure on constructing the infrastructure for processing ultra-high definition (UHD) video and the provision system.

In addition, the present invention maximizes the usage rate of the previously constructed network infrastructure since the broadband ultra-high definition (UHD) video service can be provided with the network infrastructure having a processing capacity of lower bandwidths.

Therefore, since broadband switching or routing can be performed with multiple narrow-band IP switches or routers, the present invention has an advantage of utilizing the existing infrastructure by performing IP switching/rouging through grid-based networking concept.

The present invention has been described with reference to an embodiment shown in the figures, which is an exemplification only and the various and equivalent embodiments are made possible by those who have ordinary knowledge in the area the present invention belongs to. Therefore, the technical scope of the present invention will be determined by the claims as follows.

What is claimed is:

1. An apparatus for IP switching/routing through decomposed processing of SDI format video signals is configured to:
   decompose a SDI format video signal into a Y component and a C component, multiple bit slice components or a combination thereof, and convert the decomposed components to IP packets;
   switch or route the converted IP packets; and
   convert the switched or routed IP packets to the Y component and the C component, the multiple bit slice components, or the combinations thereof, and compose the converted components into a SDI format video signal.

2. The apparatus of claim 1, wherein the apparatus is further configured to provide synchronization of processing for video signals and IP packets; and
   wherein the synchronization is to extract a synchronization signal from the SDI format video signal, decompose or combine the SDI format video signal according to the extracted synchronization signal, and combine and output the SDI format video signal while maintaining the integrity of the SDI format video signal input to the apparatus.

3. The apparatus of claim 1, wherein the apparatus is further configured to convert a color format from 4:4:4 to 4:2:2 or 4:2:0 and from 4:2:2 to 4:2:0.

4. The apparatus of claim 1, wherein the apparatus is further configured to decompose the C component into Cr component and Cb component and combine the Cr component and the Cb component into the C component.

5. The apparatus of claim 1, wherein the apparatus comprises at least one IP switch or router for processing separately multiple IP packets on a network.

6. The apparatus of claim 1, wherein the apparatus is further configured to decompose the SDI format video signal into multiple data components, compress the data components and convert the compressed data components to IP packets; and
   switch and route the converted IP packets.

7. The apparatus of claim 6, wherein the apparatus is further configured to extract the compressed data components from the switched or routed packets; and
   combine the SDI format video signal with the multiple video components.

8. The apparatus of claim 6, wherein the apparatus is further configured to provide a synchronization signal and a control signal used for bandwidth compression, packet processing and bandwidth restoration.

9. The apparatus of claim 6, wherein the apparatus is further configured to:
   perform data reduction including at least one selected from the group consisting of 1-dimensional data compression, color format conversion, and truncation of some part of the bit-slices; and
   perform data restoration of at least one selected from the group consisting of the 1-dimensional data compression, color format conversion, and restoration of some part of the bit-slices.

10. The apparatus of claim 9, wherein the apparatus is further configured to:
    perform the compression in which data compression is made through at least one selected from the group consisting of 1-D DCT, 1-D DWT, quantization, scan, RLC, and VLC; and
    perform the data restoration by a reverse process of the data compression.

11. The apparatus of claim 10, wherein the apparatus is further configured to perform 2-dimensional data compression in which a horizontal block size is larger than a vertical block size in the 2-dimensional compression.

12. The apparatus of claim 6, wherein the apparatus is further configured to switch or route multiple packets on a distributed network processed through at least one of IP switch or router.

13. A method for switching/routing through bandwidth reduction of SDI format video signals comprises:
    decomposing a SDI format video signal into multiple data components;
    compressing the data components;
    converting the compressed data to packets; and
    switching or routing the converted packets.

14. The method of claim 13, further comprising:
    extracting the compressed data from the switched or routed packets;
    restoring the compressed data;
    extracting the multiple data components; and
    combining the multiple data components into the SDI format video signal.

15. The method of claim 13, further comprising:
    generating a synchronization signal and a control signal for bandwidth reduction, packet processing and bandwidth restoration.

16. The method of claim 13, wherein:
    the decomposing comprises decomposing the SDI format video signal into a Y component and a C component, or into multiple bit slice components; and
    the combining the multiple data components comprises combining the Y component and C component, or the multiple bit slice components, into the SDI format video signal.

17. The method of claim 14, wherein compressing the data components comprises performing at least one selected from the group consisting of 1-dimensional data compression, color format conversion, and truncation of some parts of the bit-slices; and
    restoring the compressed data comprises performing at least one selected from the group consisting of restoring the 1-dimensional data compression, restoring the color format conversion, and restoring the truncated parts of bit-slices.

18. The method of claim 17, wherein compressing the data components is made through at least one selected from the group consisting of 1-D DCT, 1-D DWT, quantization, scan, RLC, and VLC; and
    restoring the compressed data is made through at least one selected from the group consisting of a reverse process of the data compression through 1-D IDCT, a reverse process of the data compression through 1-D IDWT, inverse quantization, inverse scan, RLD, and VLD.

19. The method of claim 13, further comprising:
    switching or routing multiple packets on a distributed network through at least one of IP switch or router.

20. The apparatus of claim 1, wherein the apparatus is configured to:

decompose the SDI format video signal into the Y component and the C component; and compose the Y component and C component into the SDI format video signal.

\* \* \* \* \*